United States Patent [19]

Cross et al.

[11] 4,310,719

[45] Jan. 12, 1982

[54] FEMALE TERMINAL

[75] Inventors: William E. Cross, Brookfield; Charles R. Nestor, Niles, both of Ohio

[73] Assignee: General Motors Corporation, Detroit, Mich.

[21] Appl. No.: 116,039

[22] Filed: Jan. 28, 1980

[51] Int. Cl.[3] .............................................. H02G 15/08

[52] U.S. Cl. .............................. 174/94 R; 339/275 T; 339/276 T

[58] Field of Search ................. 174/94 R; 339/275 R, 339/275 T, 276 R, 276 S, 276 T, 223 R, 277 R

[56] References Cited

U.S. PATENT DOCUMENTS

| | | | |
|---|---|---|---|
| 2,233,718 | 3/1941 | Soreng | 339/276 R |
| 2,644,146 | 6/1953 | Dupre . | |
| 2,983,898 | 5/1961 | Kalmar et al. | 339/223 R |
| 3,221,291 | 11/1965 | Pratt . | |
| 3,577,118 | 4/1971 | Reider . | |

FOREIGN PATENT DOCUMENTS

| | | | |
|---|---|---|---|
| 291992 | 6/1928 | United Kingdom | 339/223 R |

*Primary Examiner*—Gene Z. Rubinson
*Assistant Examiner*—D. A. Tone
*Attorney, Agent, or Firm*—F. J. Fodale

[57] ABSTRACT

An electrical female terminal comprises a longitudinal floor portion having an integral transverse wall at one end. A pin terminal is inserted through a hole in the transverse wall against a stop formed by an L-shaped flap which is integrally attached to a longitudinal edge of the floor portion of the female terminal. The female terminal has a second flap which is integrally attached to an opposite longitudinal edge of its floor portion and which functions as a spring clip to bias the pin terminal against a projection in the floor portion. The pin terminal is resistance welded to the projection and the flaps are spaced from the transverse wall to provide access for one of the welding electrodes.

3 Claims, 4 Drawing Figures

FEMALE TERMINAL

This invention relates generally to electrical connectors and more particularly to a female terminal for making an electrical connection to a pin terminal.

The object of this invention is to provide a simple, reliable female terminal which can be mated to a small diameter pin terminal.

Another object of this invention is to provide a simple, reliable, female terminal which has a short contact section so that it can be mated to a relatively short pin terminal.

Still another object of this invention is to provide a female terminal which can be resistance welded to a small diameter pin terminal.

Yet another object of this invention is to provide a female terminal which is configured to provide sufficient flexibility for easy insertion of the pin terminal and a subsequent positive fit to the pin even when the female terminal is made of relatively thick metal.

Other objects and features of the invention will become apparent to those skilled in the art as the disclosure is made in the following detailed description of a preferred embodiment of the invention as illustrated in the accompanying sheet of drawing in which.

Figure 4:
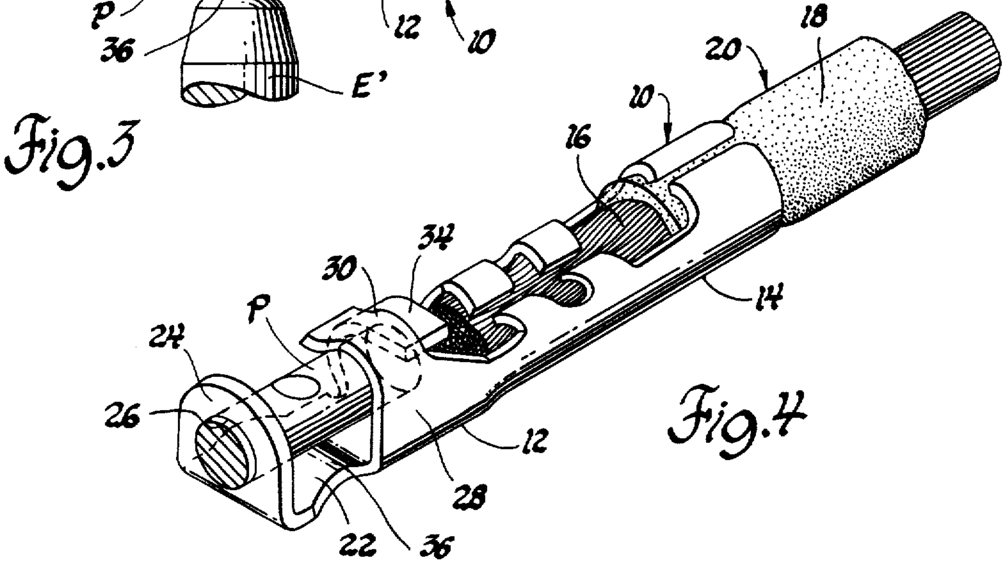
FIG. 4 is a perspective view of the pin and female terminals shown in FIGS. 1, 2 and 3.

Referring now to the drawing, there is shown a female terminal 10 of one-piece sheet metal construction which is stamped and bent to form a contact portion 12 and a cable attachment portion 14. The cable attachment portion 14 is more or less of conventional design comprising an open barrel having wings which are crimped to clamp the terminal 10 to the conductor core 16 and insulation jacket 18 of an electric cable 20 as best shown in FIG. 4.

The contact portion 12 comprises a longitudinal, generally planar, floor 22 which is attached to the cable attachment portion 14 at one end. The opposite end has an integral transverse wall 24 which has an aperture 26 extending through it in the longitudinal direction for receiving the pin terminal P.

Figure 1:
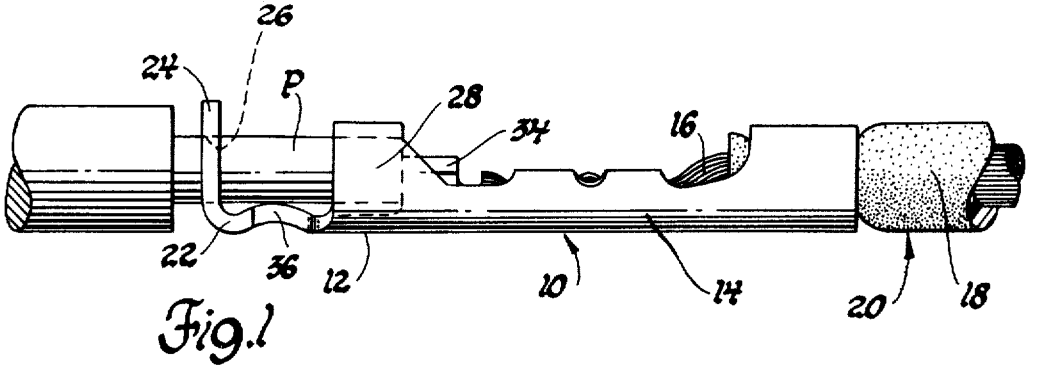
FIG. 1 is a side view of a pin terminal mated to a female terminal in accordance with this invention.
Figure 2:
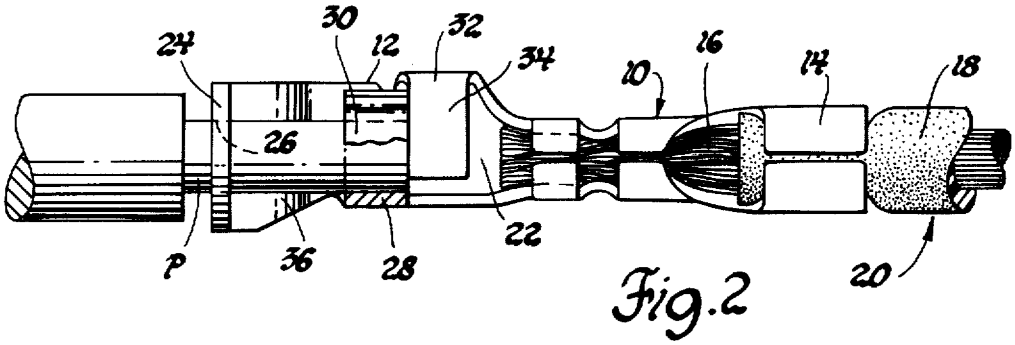
FIG. 2 is a top view of the pin and female terminals shown in FIG. 1.
Figure 3:
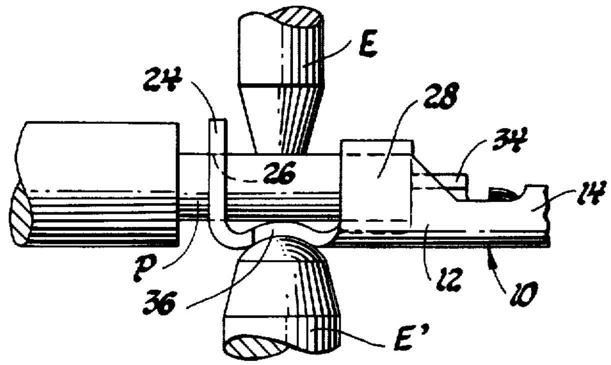
FIG. 3 is a side view showing the mating portions of the pin and female terminals being resistance welded together.

The contact portion 12 further comprises a resilient clip in the form of an L-shaped flap 28 which is attached to one longitudinal side edge of the floor 22 and which is spaced from the transverse wall 24 to provide access for a welding electrode E as shown in FIG. 3. The flap 28 also preferably has a crossover portion 30 which is curvilinear so that the end of the pin terminal P is retained in the lateral as well as the vertical direction.

The contact portion 12 also has a second L-shaped flap 32, attached to the opposite longitudinal edge of the floor 22. The crossover portion 34 of the flap 32 is behind the crossover portion 30, that is, the side toward the cable attachment portion 14, and closer to the floor 22. The crossover portion 34 thus acts as a stop which limits insertion of the pin terminal P.

Between the transverse wall 24 and the flap 28, the floor 22 has a projection 36, preferably in the shape of an arcuate channel which crosses the floor 22 and has its convex side in the direction of the transverse wall 24.

The female terminal 12 and pin terminal P are mated by inserting the pin terminal P through the hole 26 until a peripheral end portion of the pin terminal P is beneath the cross-over portion 30 and the end face of the pin terminal P bottoms against the crossover portion 34. In the mated position, the periphery of the pin terminal P is biased against the projection 22 under the action of the resilient clip formed by the flap 30.

The mated terminals may then be resistance welded together by the electrodes E and E' as shown in FIG. 3.

Permanently securing the terminals together is particularly advantageous in a low current application, such as in making connections to oxygen sensor electrodes. Terminals for low current connection are usually fabricated from "thin" metal stock having a thickness of 0.25 mm. However the terminal 10 may be fabricated from a considerably thicker, 0.41 mm, metal stock which results in a better resistance weld to the pin terminal P. Even when the terminal 10 is made of the relatively thicker stock, it still retains sufficient flexibility for easy insertion of the pin terminal P while also providing a positive fit to the pin terminal P under the spring action of the resilient clip formed by the flap 28.

The contact portion 12 is also relatively short so that the terminal 10 can be mated to pin terminals which are relatively short as well as small in diameter. For instance, female terminals have been designed and successfully attached to 1.58 mm diameter pin terminals which are only 6.2 mm long.

We wish it to be understood that we do not desire to be limited to the exact details of construction shown and described, for obvious modifications will occur to a person skilled in the art.

The embodiments of the invention in which an exclusive property or privilege is claimed are defined as follows:

1. An electrical female terminal adapted for resistance welding to a pin terminal comprising:

a longitudinal floor portion having an integral transverse wall at a longitudinal end thereof, said wall having a hole extending longitudinally therethrough for insertion of the pin terminal, a first flap which is integrally attached to a longitudinal side edge of the floor portion and spaced longitudinally from the transverse wall, said first flap having a crossover portion to provide a stop for the pin terminal when it is inserted through the hole in the transverse wall, a second flap which is integrally attached to an opposite longitudinal side edge of the floor portion and which has a crossover portion spaced closer to the transverse wall for engaging a peripheral end portion of the pin terminal when it is inserted through the hole in the transverse wall and bottomed against the stop, said floor portion having a projection located between the transverse wall and the crossover portions of the flaps, said second flap being adapted for biasing a peripheral surface of the pin terminal against the projection for resistance welding thereto, and said crossover portion of the second flap being spaced from the transverse wall to provide access for a welding electrode to engage a peripheral surface of the pin terminal opposite the peripheral surface engaged by the projection.

2. An electrical female terminal adapted for attachment to a pin terminal comprising:

a longitudinal floor portion having an integral transverse wall at a longitudinal end thereof, said wall having a hole extending longitudinally therethrough for insertion of the pin terminal, resilient clip means for engaging a peripheral end surface of the pin terminal comprising a first flap which is integrally attached to a longitudinal edge of the floor portion and spaced longitudinally from the transverse wall, said first flap having a curvilinear crossover portion for engaging the peripheral end surface of the pin terminal to retain the pin terminal laterally and vertically, stop means for limiting insertion of the pin terminal comprising a second flap which is integrally attached to an opposite longitudinal edge of the floor portion and has a crossover portion which is behind the crossover portion of the first flap and closer to the floor portion, for engaging an end face of the pin terminal, said floor portion having an arcuate channel-shaped projection which crosses the floor portion at a location between the transverse wall and the flaps, and said resilient clip means being adapted for biasing a peripheral surface of the pin terminal against the projection when its crossover portion engages the peripheral end portion of the pin terminal.

3. An electrical female terminal adapted for resistance welding to a pin terminal comprising:

a longitudinal floor portion having an integral transverse wall at a longitudinal end thereof, said wall having a hole extending longitudinally therethrough for insertion of a pin terminal, a first flap which is integrally attached to a longitudinal side edge of the floor portion and spaced longitudinally from the transverse wall, said first flap having a crossover portion to provide a stop for the pin terminal when it is inserted through the hole in the transverse wall, a second flap which is integrally attached to an opposite longitudinal side edge of the floor portion and which has a crossover portion spaced closer to the transverse wall for engaging a peripheral end portion of the pin terminal when it is inserted through the hole in the transverse wall and bottomed against the stop, said floor portion having an arcuate channel-shaped projection located between the transverse wall and the crossover portions of the flaps, said projection crossing the floor portion in the transverse direction and having its convex surface in the direction of the transverse wall, said second flap being adapted for biasing a peripheral surface of the pin terminal against the convex surface of the projection for resistance welding the terminals together, and said crossover portion of the second flap being spaced from the transverse wall to provide access for a welding electrode to engage a peripheral surface of the pin terminal opposite the peripheral surface engaged by the convex surface of the projection.

* * * * *